(12) United States Patent
Pantfoerder et al.

(10) Patent No.: US 10,165,347 B2
(45) Date of Patent: Dec. 25, 2018

(54) HEADSET MICROPHONE TYPE DETECT

(71) Applicant: Apple Inc., Cupertino, CA (US)

(72) Inventors: Achim Pantfoerder, Cupertino, CA (US); Hugo Fiennes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 14/510,961

(22) Filed: Oct. 9, 2014

(65) Prior Publication Data

US 2015/0023520 A1    Jan. 22, 2015

Related U.S. Application Data

(62) Division of application No. 12/194,438, filed on Aug. 19, 2008, now Pat. No. 8,861,743.

(Continued)

(51) Int. Cl.
*H04R 1/10* (2006.01)
*H04M 1/60* (2006.01)
(Continued)

(52) U.S. Cl.
CPC ........ *H04R 1/1041* (2013.01); *H04M 1/6058* (2013.01); *H01R 13/703* (2013.01);
(Continued)

(58) Field of Classification Search
CPC .... H04R 1/1041; H04R 2490/09; H04R 3/00; H04R 2410/00; H04M 1/6058; H04M 1/0214; H04M 1/0245; H04M 1/6041; H04M 2250/12; Y10T 307/826; Y02B 60/50; H01R 24/58; H01R 13/703
(Continued)

(56) References Cited

U.S. PATENT DOCUMENTS 4,551,854 A * 11/1985 Rutty .................. H04B 1/44
   455/528
4,922,547 A   5/1990 Murata
(Continued)

FOREIGN PATENT DOCUMENTS

WO   WO 2006/045617 A2 *  5/2006
WO   WO 2006045617 A2 *   5/2006 .......... H04M 1/6058
WO   WO 2008/041064 A2 *  4/2008

*Primary Examiner* — Yogeshkumar Patel
(74) *Attorney, Agent, or Firm* — Womble Bond Dickinson (US) LLP

(57) ABSTRACT

Embodiments of the invention include methods, apparatus, systems and means for determining a type of microphone button of a headset plugged into a device jack are described. In some embodiments, a type of microphone button or headset is determined from a plurality of button or headset types based on whether or not a headset plug is detected in a headset jack of a device and whether or not a signal received at a first contact of the headset jack includes an overcurrent or an undercurrent. In some embodiments, the behavior of the device may be controlled based on the type of microphone button or headset determined. For example, a predetermined circuit, a predetermined algorithm, or a predetermined process may be selected to signal process the audio signal of the microphone, based on the type of microphone button or headset. Other embodiments are also described and claimed.

27 Claims, 9 Drawing Sheets

Related U.S. Application Data

(60) Provisional application No. 61/130,495, filed on May 30, 2008.

(51) Int. Cl.
    *H01R 13/703* (2006.01)
    *H01R 24/58* (2011.01)

(52) U.S. Cl.
    CPC .......... *H01R 24/58* (2013.01); *H04R 2420/09* (2013.01); *Y10T 307/826* (2015.04)

(58) Field of Classification Search
    USPC ........ 381/74, 370, 94.5, 22, 384; 455/569.1, 455/550.1, 557, 553.1, 552.1
    See application file for complete search history.

(56) References Cited

U.S. PATENT DOCUMENTS

| | | | | |
|---|---|---|---|---|
| 4,941,187 A * | 7/1990 | Slater | ................... | H04M 9/001 381/74 |
| 5,473,676 A * | 12/1995 | Frick | ................... | H04M 1/6505 375/222 |
| 5,557,653 A * | 9/1996 | Paterson | ................... | H04B 1/38 455/575.2 |
| 5,596,638 A * | 1/1997 | Paterson | ................... | H04B 1/38 379/430 |
| 5,794,163 A | 8/1998 | Paterson et al. | | |
| 5,832,075 A * | 11/1998 | Gancarcik | ............... | H04M 1/53 379/377 |
| 5,910,991 A * | 6/1999 | Farrar | ................... | G06F 3/165 381/120 |
| 5,939,656 A * | 8/1999 | Suda | ................... | G10H 1/0091 381/63 |
| 5,978,689 A * | 11/1999 | Tuoriniemi | ............ | H04M 1/05 455/351 |
| 6,266,424 B1 * | 7/2001 | Papadopoulos | ..... | H04M 1/6008 381/111 |
| 6,397,087 B1 * | 5/2002 | Kim | ................... | H04B 1/3877 381/110 |
| 6,470,197 B1 * | 10/2002 | Tuoriniemi | ......... | H04M 1/6058 455/575.2 |
| 6,597,786 B1 * | 7/2003 | Lin | ................... | H04M 1/6033 379/388.02 |
| 6,615,059 B1 | 9/2003 | Pehrsson et al. | | |
| 6,771,780 B2 * | 8/2004 | Hong | ................... | H04R 1/1041 381/384 |
| 6,856,046 B1 * | 2/2005 | Scarlett | ................. | H01R 29/00 307/125 |
| 6,885,899 B1 * | 4/2005 | Yoon | ................... | G06F 3/165 375/296 |
| 6,970,752 B1 * | 11/2005 | Lim | ................... | H03M 11/24 381/123 |
| 7,003,092 B1 * | 2/2006 | Lester | ................ | H04M 1/6033 379/387.01 |
| 7,113,804 B2 * | 9/2006 | McKinney | ............ | H04W 88/06 455/41.1 |
| 7,167,569 B1 * | 1/2007 | Seven | ................... | H04R 5/04 330/124 R |
| 7,236,749 B2 * | 6/2007 | Reyes | ................... | G08G 5/0013 455/517 |
| 7,349,546 B2 * | 3/2008 | Ganton | ................ | H04R 5/04 379/430 |
| 7,450,726 B2 | 11/2008 | Goyal | | |
| 7,483,722 B2 * | 1/2009 | Tsai | ................... | A61N 1/18 379/413 |
| 7,564,966 B2 | 7/2009 | Sano | | |
| 7,620,434 B2 * | 11/2009 | Shin | ................... | H04M 1/82 455/569.1 |
| 7,623,667 B2 * | 11/2009 | Sander | ................... | H04M 1/05 381/74 |
| 7,834,634 B2 * | 11/2010 | Martin | ................... | H01H 9/167 307/115 |
| 7,912,501 B2 * | 3/2011 | Johnson | ............... | H01R 13/703 455/556.1 |
| 7,917,172 B2 * | 3/2011 | Thijssen | .............. | H04M 1/6058 455/550.1 |
| 7,949,802 B2 * | 5/2011 | Gallant | ............... | G06F 13/4081 710/300 |
| 8,036,413 B2 * | 10/2011 | Kim | ....................... | G08C 19/00 381/370 |
| 8,077,878 B2 * | 12/2011 | Keehr | ................. | H04M 1/6058 381/92 |
| 8,362,654 B2 * | 1/2013 | Inha | ..................... | H03K 17/687 307/112 |
| 8,412,268 B2 * | 4/2013 | Inha | ..................... | H04M 1/6058 348/14.01 |
| 8,509,857 B2 * | 8/2013 | Enjalbert | ............. | H04M 1/6058 381/122 |
| 8,548,175 B2 * | 10/2013 | Im | ........................ | H04R 1/1041 381/74 |
| 8,718,722 B2 * | 5/2014 | Fukunaga | ........... | H04M 1/0258 381/111 |
| 9,148,722 B2 * | 9/2015 | Howlett | ................... | H04R 3/00 |
| 9,301,045 B2 * | 3/2016 | Johnson | ............... | H01R 13/703 |
| 2002/0037746 A1 * | 3/2002 | Osano | ................ | H04M 1/585 455/557 |
| 2004/0175993 A1 | 9/2004 | Chennakeshu | | |
| 2005/0053243 A1 * | 3/2005 | Ganton | .................... | H04R 5/04 381/58 |
| 2005/0090141 A1 * | 4/2005 | Peng | ....................... | H01R 24/58 439/488 |
| 2005/0111675 A1 * | 5/2005 | Lee | ........................... | H04R 5/02 381/104 |
| 2005/0201568 A1 * | 9/2005 | Goyal | ................. | H04M 1/6058 381/74 |
| 2006/0255812 A1 * | 11/2006 | Martin | ................... | H01H 9/167 324/609 |
| 2007/0049103 A1 | 3/2007 | Kashi et al. | | |
| 2007/0110252 A1 * | 5/2007 | Garcia | .................... | H04R 5/00 381/58 |
| 2008/0112572 A1 * | 5/2008 | Wong | ................... | H04R 1/1041 381/74 |
| 2008/0130911 A1 * | 6/2008 | Tsen | ........................ | H04R 5/04 381/74 |
| 2008/0164994 A1 * | 7/2008 | Johnson | ............... | H01R 13/703 340/533 |
| 2008/0165986 A1 | 7/2008 | Daniels et al. | | |
| 2008/0166003 A1 | 7/2008 | Hankey et al. | | |
| 2008/0175402 A1 * | 7/2008 | Abe | ....................... | G10K 11/178 381/71.6 |
| 2008/0305676 A1 * | 12/2008 | Fiennes | ............... | H01R 13/7031 439/489 |
| 2008/0318629 A1 * | 12/2008 | Inha | ..................... | H04M 1/6058 455/557 |
| 2009/0179768 A1 * | 7/2009 | Sander | ................... | H04M 1/05 340/13.27 |
| 2009/0180659 A1 * | 7/2009 | Sander | ................... | H04M 1/05 381/384 |
| 2010/0014701 A1 * | 1/2010 | Li | ....................... | H01R 13/7032 381/384 |
| 2010/0029344 A1 * | 2/2010 | Enjalbert | ............. | H04M 1/6058 455/569.1 |
| 2010/0061565 A1 * | 3/2010 | Saraoka | ............... | G10K 11/178 381/71.6 |
| 2010/0166205 A1 * | 7/2010 | Yamaoka | ............ | G10K 11/178 381/71.6 |
| 2010/0272252 A1 * | 10/2010 | Johnson | ............... | H04R 1/1041 379/430 |
| 2012/0092140 A1 * | 4/2012 | Deluca | ................ | G05B 19/0426 340/12.31 |
| 2012/0104870 A1 * | 5/2012 | Chang | ................. | H01R 13/6683 307/125 |
| 2013/0343561 A1 * | 12/2013 | Johnson | ............... | H01R 13/703 381/74 |

* cited by examiner

| | STATE E1 | STATE E2 | NO HEADSET PLUGGED IN | HEADSET PLUGGED IN, BUTTON RELEASED | BUTTON TYPE ASSOCIATED WITH NORMALLY OPEN CIRCUIT SWITCH, BUTTON PRESSED TO SHORT CIRCUIT (HEADSET PLUGGED INTO JACK) | BUTTON TYPE ASSOCIATED WITH NORMALLY SHORT CIRCUIT SWITCH, BUTTON PRESSED TO OPEN CIRCUIT (HEADSET PLUGGED INTO JACK) |
|---|---|---|---|---|---|---|
| NORMAL CURRENT (V1) | 1 | | | 1 | | |
| OVER CURRENT (V0) | | 1 | | | 1 | |
| UNDER CURRENT (V2) | | | 1 | | | 1 |
| PLUG DETECTION | | | | 1 | 1 | 1 |

FIG. 10

HEADSET MICROPHONE TYPE DETECT

CROSS-REFERENCE TO RELATED APPLICATION

This application is a divisional of U.S. patent application Ser. No. 12/194,438 which was filed on Aug. 19, 2008 and claims the benefit of the earlier filing date of U.S. Provisional Patent Application No. 61/130,495, filed May 30, 2008, and incorporated herein by reference.

FIELD

An embodiment of the present invention relates to an open/close microphone detect mechanism for determining a type of microphone button of a headset plugged into a device jack.

BACKGROUND

Portable devices, such as cell phones, are becoming increasingly common. These portable devices have grown more complex over time, incorporating many features, including, for example, MP3 player capabilities, web browsing capabilities, capabilities of personal digital assistants (PDAs) and the like. Most of these devices include device jacks into which a headset or headphones may be plugged. In some cases, the headsets include earphones for listening to output of the device as well as a microphone to provide input to the device. The headset has a push button to control whether or not the microphone output is sent to the device.

SUMMARY

Methods, apparatus, systems and means for determining a type of microphone button of a headset plugged into a device jack are described. In some embodiments, the type of a given microphone button (or type of headset) is selected (e.g., identified or determined) from several predefined button types (or headset types), based on whether or not a headset plug is detected in a headset jack of a device and whether or not a signal received at a first contact of the headset jack includes an overcurrent or an undercurrent (e.g., when the button is pressed, or not in its normal position). The behavior of the device may be controlled (or changed) based on the determined type of microphone button. For example, a predetermined circuit, a predetermined algorithm, or a predetermined process may be selected to process the audio signal of the microphone, based on the type of microphone button. Also, for example, a change may be made from one member to another members of a set of predetermined circuits, predetermined algorithms, or predetermined processes to process the audio signal of the microphone, based on the type of microphone button.

In some embodiments, the voltage of the signal (at a contact of the headset jack, such as at the first contact) may be compared with an upper voltage threshold and a lower voltage threshold, so that the undercurrent is detected if the voltage of the signal is greater than the upper voltage threshold and the overcurrent is detected if the voltage of the signal is below the lower voltage threshold. The type of microphone button may be a button associated with a normally open switch, if the first signal is detected to be an overcurrent, and with a normally closed switch if the first signal is detected to be an undercurrent. Thus, a type of the headset may be determined based on the type of microphone button (e.g. when the button is pressed) as follows: (1) if the signal is undercurrent, the a microphone button switches between (a) coupling the microphone and (b) coupling an open circuit, to a contact of the plug, or (2) if the signal an overcurrent, the microphone button switches between (a) coupling the microphone and (b) coupling a short circuit to a contact of the plug.

BRIEF DESCRIPTION OF THE DRAWINGS

The present embodiments are illustrated by way of example and not limitation in the figures of the accompanying drawings in which like references indicate similar elements.

FIG. 10 is a truth table of one embodiment of output states or outputs of a microphone button type detect circuit based on current detected and plug detection.

DETAILED DESCRIPTION OF PREFERRED EMBODIMENTS OF THE INVENTION

Figure 1:
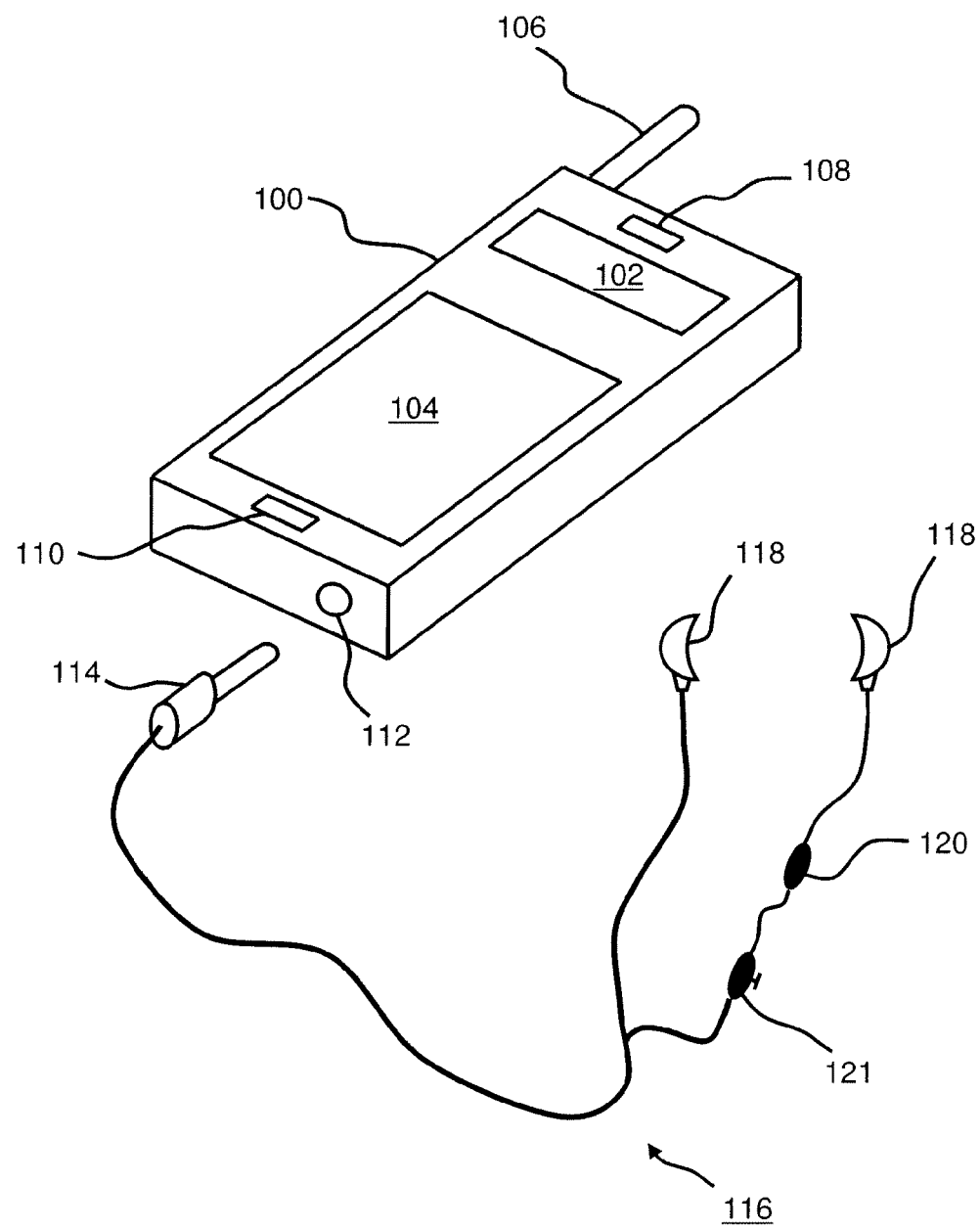
FIG. 1 shows an example of a cellular telephone which includes a headset jack, and a headset having a headset plug.

Various embodiments and aspects of the inventions will be described with reference to details discussed below, and the accompanying drawings will illustrate the various embodiments. The following description and drawings are illustrative of embodiments of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

In order to provide a proper and efficient operation of devices such as a portable device, plug detection mechanisms may be used for detecting when (e.g., checking to determine whether or not) a plug is present or has been inserted or removed from a device jack. The device can be configured to adjust its operation responsive thereto. In addition, in order for proper and more efficient device operation, a type of microphone button detection or determining mechanism may be used to detect a type of microphone button included in a headset that is inserted into the jack. Thus, the device can be configured to adjust its operation responsive to the type of microphone button or headset as well as responsive to detecting when a plug is present. For example, a determination may be made as to whether or not the type of microphone button is a certain type from a plurality of button types, such as those including a button associated with a normally open circuit switch that provides a short circuit across the microphone when pressed; or a normally short circuit switch that provides an open circuit in (e.g., across) the microphone signal line when the button is pressed. When the button is not pressed, the microphone signal line may provide a "normal" current voltage or signal having audio detected by the microphone.

While the following discussion describes some embodiments of the present invention in the context of electronic devices including, but not limited to cellular telephones, recorders, and/or MP3 players (e.g., devices that may include a memory storing a media player application, such as an audio or visual player, and a processor), some embodiments of the present invention can be incorporated in any electronic device or telephone, portable or not portable, that needs to determine when a plug has been inserted or removed from a jack, and/or a type of microphone button of a headset coupled to the plug. Contemplated electronic devices also include portable wireless communications devices that may include one or more other functionalities described herein, and thus may be referred to as "multifunctional". For example, an electronic device may detect the presence of a plug in a jack, or when a plug has been inserted or removed from a jack if the device is configured to behave differently based thereon. Similarly, an electronic device may behave differently based on a type of microphone button detected, identified or determined.

FIG. 1 illustrates cellular telephone 100 in accordance with one embodiment of the present invention. Cell phone 100 can have display 102, user input interface 104, and external antenna 106. Display 102 can provide graphical information to a user. User input interface 104 can permit a user to input information into cell phone 100. For example, user input interface 104 can include one or more buttons, one or more touchpads, one or more touchscreens, one or more scrollwheels, one or more clickwheels, one or more sliders, any other appropriate input mechanism, or any combination thereof. In some embodiments of the present invention, display 102 and user input interface 104 can be combined, e.g., in a touchscreen or touchsensitive display.

Cell phone 100 also can be equipped with built-in speaker 108, built-in microphone 110, and headset jack 112. Built-in speaker 108 can output audible sound to a user, while built-in microphone 110 can accept audible sound from the user. Headset jack 112 can accept plug 114 from headset 116. When headset plug 114 is properly inserted into headset jack 112, cell phone 100 can be configured to output audible sound from earphones 118 rather than speaker 108.

Similarly, when headset plug 114 is properly inserted into headset jack 112, cell phone 100 can be configured to accept audible sound from headset microphone 120 rather than cell phone microphone 110. When headset plug 114 is properly inserted into jack 112, cell phone 100 can be configured to receive an audio signal created by audible sound received at microphone 110. Microphone button 121 can be used to control the output of microphone 110 to cell phone 100, such as to control the signal received at jack 112 for the microphone; and/or to control (or change) the behavior of cell phone 100. Control of behavior includes changing behavior, such as between at least any two behaviors or caused actions as described herein. Specifically, example behaviors of cell phone 100 that can be controlled (or changed) when button 121 is pressed (e.g., by pressing the button), include (but are not limited to): (1) causing the phone to turn microphone 120 on and off, (2) determining when the phone will attempt to determine the microphone button type of button 121, and/or (3) causing the phone to determine the microphone button type of button 121. For example, when headset plug 114 is properly inserted into jack 112, pressing button 121 can change the behavior of cell phone 100 by causing it to detect the type of microphone button that microphone button 121 is, from a number of different predetermined types of microphone buttons associated with (or defined by) different types of microphone button circuitry.

In some embodiments, the type of a given microphone button (or type of headset) is identified from several predefined button types (or headset types), based on whether or not a headset plug is detected in a headset jack of a device and whether or not a signal received at a first contact of the headset jack includes an overcurrent or an undercurrent (e.g., when the button is pressed, or not in its normal position). Thus, the type of a given microphone button (or type of headset) may be selected from more than one predefined button (or headset) type of a predetermined list or set of button (or headset) types.

Button 121 may be a button that is pressed once sufficient pressing pressure is put on the button, and is released (e.g., in a non-pressed or not pressed position) once sufficient pressing pressure is taken off of the button. In this case, button 121 may be a type of button that does not lock but only maintains a pressed position while it is being pressed, and returns to not being pressed once sufficient pressing pressure is taken off of the button. Alternatively, button 121 may be a type of button that when pressed, starting in the non-pressed position, locks or maintains a pressed position until pressed again (e.g., it has two states—pressed and non-pressed).

In some embodiments, cell phone 100 may represent any one or more of the various electronic devices having jack 112, as described herein. For example, phone 100 may include a processor coupled to a memory (e.g., storing a media software application), the processor to execute instructions (e.g., computer program instructions) stored in the memory. The memory may be described as a machine (e.g. computer) readable storage medium. The memory may be a non-volatile memory from which the instructions are loaded to a volatile memory (e.g., RAM) during execution by the processor. Moreover, the processor and memory may include or be coupled to circuitry 129, control unit 130, and/or circuitry 149 of FIG. 5 described below. Similarly, headset 116 may represent one or more accessory components having plug 114, such as also described further below.

Figure 2A:
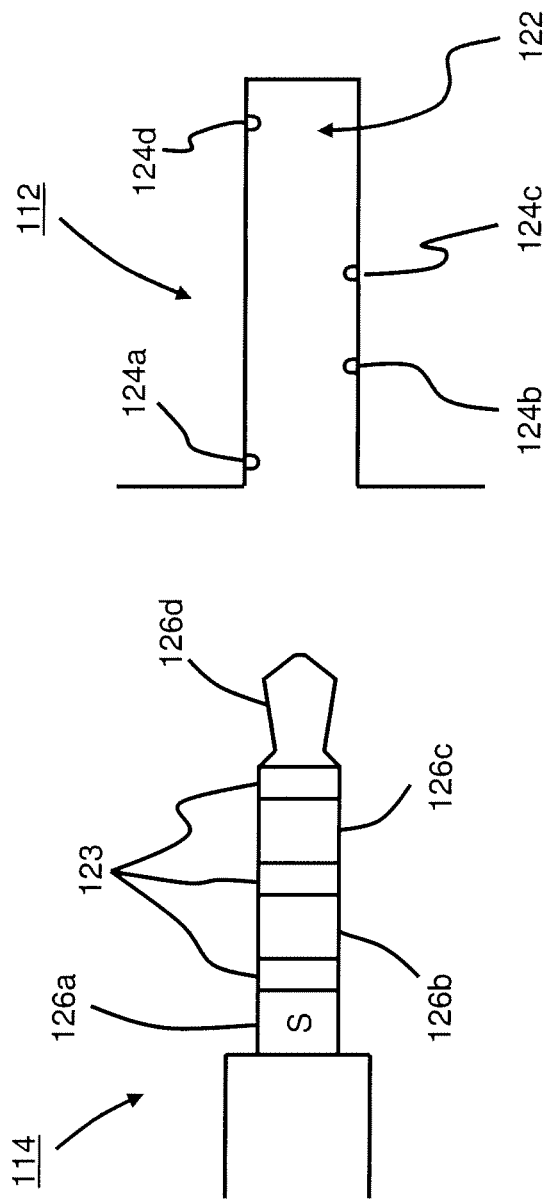
FIGS. 2A and 2B show an example of a headset jack and headset plug.
Figure 2B:
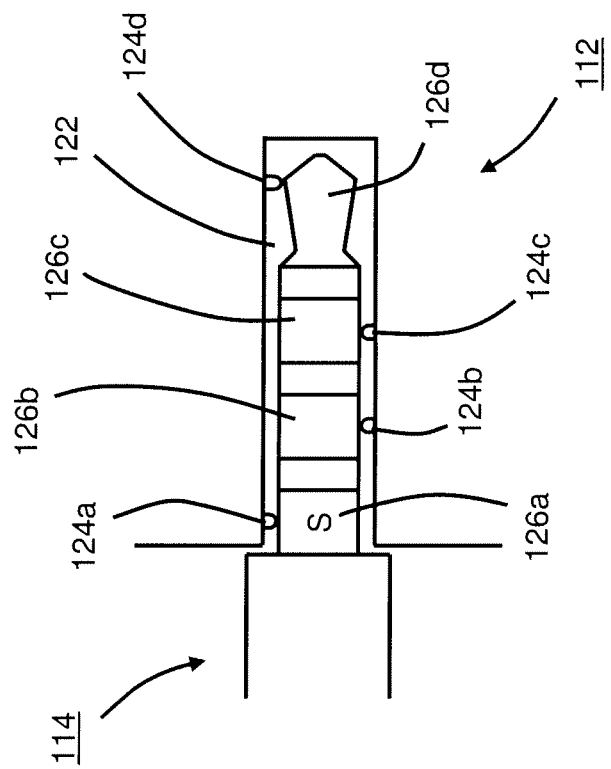

FIGS. 2A-2B illustrate headset jack 112 and headset plug 114 in greater detail in accordance with one embodiment of the present invention. Headset jack 112 can have receptacle 122 within which is disposed one or more contacts 124a-124d. Headset plug 114 can have complementary contacts 126a-126d. Each contact 124a-124d can be electrically isolated from adjacent contacts. Likewise, each contact 126a-126d also can be electrically isolated from adjacent contacts, such as by insulator rings 123 spaced along the length of plug 114.

When headset plug is inserted into receptacle 122 of headset jack 112, contacts 124a-124d can make electrical contact with (e.g., touch) contacts 126a-126d, respectively. In one illustrative embodiment of the present invention, contacts 124a and 126a can transmit (e.g., pass) signals from microphone 120 of headset 116 to cell phone 100, contacts 124b and 126b can act as ground, and contacts 124c-d and 126c-d can transmit signals from cell phone 100 to earphones 118 of headset 116.

Also, in some embodiments, contacts 124A and 126A can transmit signals from, of circuits including, or passing through switch 121 of headset 116 to cell phone 100. FIGS. 2A and 2B also show plug 114 having signal "S" at contact 126a. Signal "S" may be a signal that results from the output of microphone 120 and/or button 121 as described further below. For example, button 121 may provide multiple functions, such as by allowing microphone 120 to be disabled, and by providing a signal to cell phone 100 that allows cell phone 100 to determine or identify the button type of button 121. In some cases, button 121 may be described as a multi-function button, or a "push to talk" button, such as a button that has functionality as described herein. For example, the button can be pressed to cause cell phone 100 to pick up or connect a phone call and/or to hang up or disconnect a phone call, as well as to identify a type of microphone button or type of headset. In some cases, button 121 can be used to switch between telephone call lines, such as by double pressing the button, and can be used to determine whether or not headset jack 112 or the jack's detection of plug 114 is operating properly. Each contact 124a-d also can be assigned to serve other roles. For example, contact 124d and 126d can serve as ground and the remaining contacts can transmit signals.

Figure 3A:
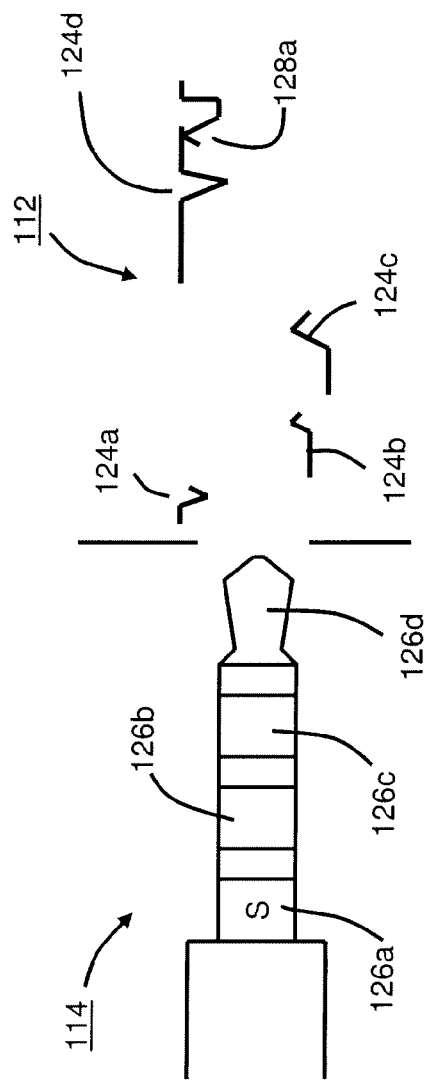
FIGS. 3A and 3B show an example of plug contacts and jack detect contacts for detecting a plug and determining a type of microphone button.
Figure 3B:
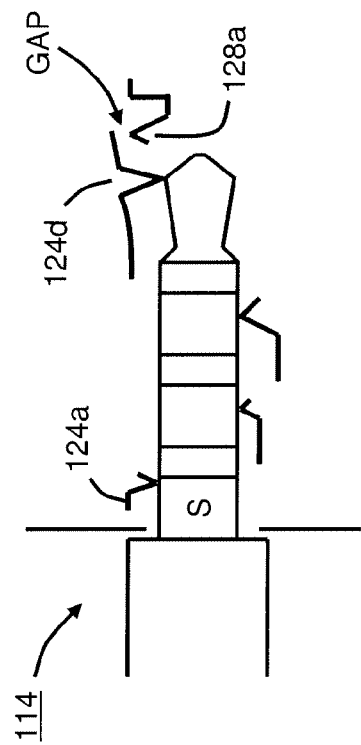

FIGS. 3A-3B illustrate a plug detection and type of microphone button detection mechanism in accordance with one embodiment of the present invention. To detect whether headset plug 114 is inserted into headset jack 112, cell phone 100 can have a switch that is actuated when the headset plug is inserted into the jack. For example, cell phone 100 can have detect contact 128a in jack 112 to facilitate detection. One of the functional contacts of jack 112 (e.g., contact 124d) can be spring-loaded so that it is biased against detect contact 128a when no plug is inserted. When a plug is inserted, pressure from the tip of the plug can bend contact 124d away from detect contact 128a, creating a gap between contacts 124d and 128a and opening the circuit previously established across the two contacts. This can cause the signal on detect contact 128a to go high (greater than or equal to a predetermined value), which can be detected by a plug detect circuit and/or a control unit in the cell phone, as described further herein. In some cases, circuitry coupled to contacts 124d and 128a can be configured to cause the signal on detect contact 128a to go low instead of high when a plug is inserted into the jack. Advantageously, because detect contact 128a is electrically isolated from the functional contacts when the plug is inserted, the detect contact does not interfere with the signals transmitted through the jack.

Figure 4A:
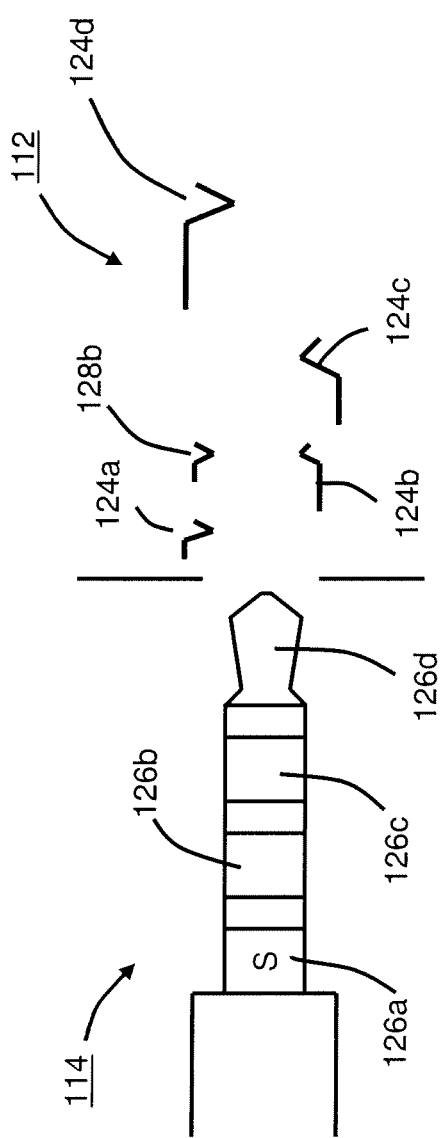
FIGS. 4A and 4B show another example of plug contacts and jack detect contacts for detecting a plug and determining a type of microphone button.
Figure 4B:
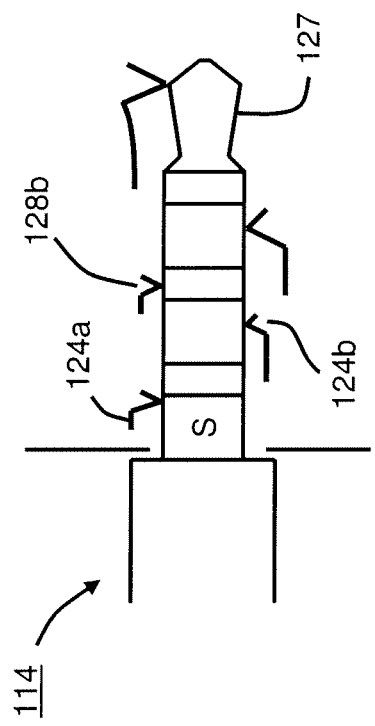

FIGS. 4A-4B illustrate a plug detection and type of microphone button detection mechanism in accordance with another embodiment of the present invention. In this embodiment, detect contact 128b can be located within jack 112 so that one of the contacts in plug 114 creates a low impedance path between detect contact 128b and one of the other contacts 124a-124d when the plug is inserted into receptacle 122. The actual metal of headset plug 114 can be used to complete the circuit between these two contacts. Thus, when plug 114 is inserted into jack 112, a low impedance path is created between detect contact 128b and contact 124b, thereby causing the signal on detect contact 128b to go low (less than or equal to a predetermined value). This signal can be detected by a plug detect circuit and/or a control unit in the cell phone, as described further herein. When plug 114 is present within jack 112, the circuit signal path created through plug 114 and to detect contact 128b may have a relatively higher impedance path as compared to the circuit signal path created through plug 114 and to contact 124b. However, this relatively high impedance path may still be a low impedance circuit path or have a low enough impedance to be detected as compared to an open circuit or a relatively much higher impedance path. In some cases, circuitry coupled to contacts 124b and 128b can be configured to cause the signal on detect contact 128a to go high instead of low when a plug is inserted into the jack. Advantageously, detect contact 128b can be wiped every time the plug is inserted or removed from jack 112. So, if debris collects on the contact, it will be cleaned off when the plug is removed or inserted into the jack.

In one embodiment of the present invention, detect contact 128b can be disposed within jack 112 so that one or more contacts on plug 114 forms a low impedance path between a ground contact in the jack and detect contact 128b when the plug is inserted into the jack. For example, in the illustrative embodiment of FIGS. 4A-4B, contact 124b can serve as ground and detect contact 128b can be disposed opposite thereto in jack 112. Since signals on contacts 124a, 124c, and 124d can be referenced to contact 124b, no signal degradation will occur (e.g., only an amount that does not effect the signal processing or output). In comparison, if detect contact 128b is disposed to complement contact 124a, 124c, or 124d, it may affect the signals transmitted over the circuit. FIGS. 3A, 3B, 4A and 4B also show signal "S" at contact 126a. Thus, the signal "S" may be conducted to contact 124a when the plug is inserted into the jack (e.g., see FIGS. 3B and 4B), such as by contact 126a touching or being in electrical contact with contact 124a.

Some embodiments may include positioning contact 124d and/or detect contact 128b within jack 112 (for electrically contacting and/or transmitting signals to contact 126d) and biased such that they can rest within an indent 127 along an outer surface of plug 114 when plug 114 has been properly inserted within jack 112. Indent 127 may be any suitable size and shape and may be positioned anywhere along the length of plug 114. For example, contact 124d and/or detect contact 128b may include a retention spring that can exert a retention force on indent 127 of plug 114 such that plug 114 may not be withdrawn from jack 112 without a user pulling firmly on plug 114 or headset 116. Advantageously, because contact 124d and/or detect contact 128b can act to retain plug 114 within jack 112 as well as to electrically detect the presence of plug 114 within jack 112, contact 124d and/or detect contact 128b provide an efficient use of resources within electronic device 100.

Figure 5:
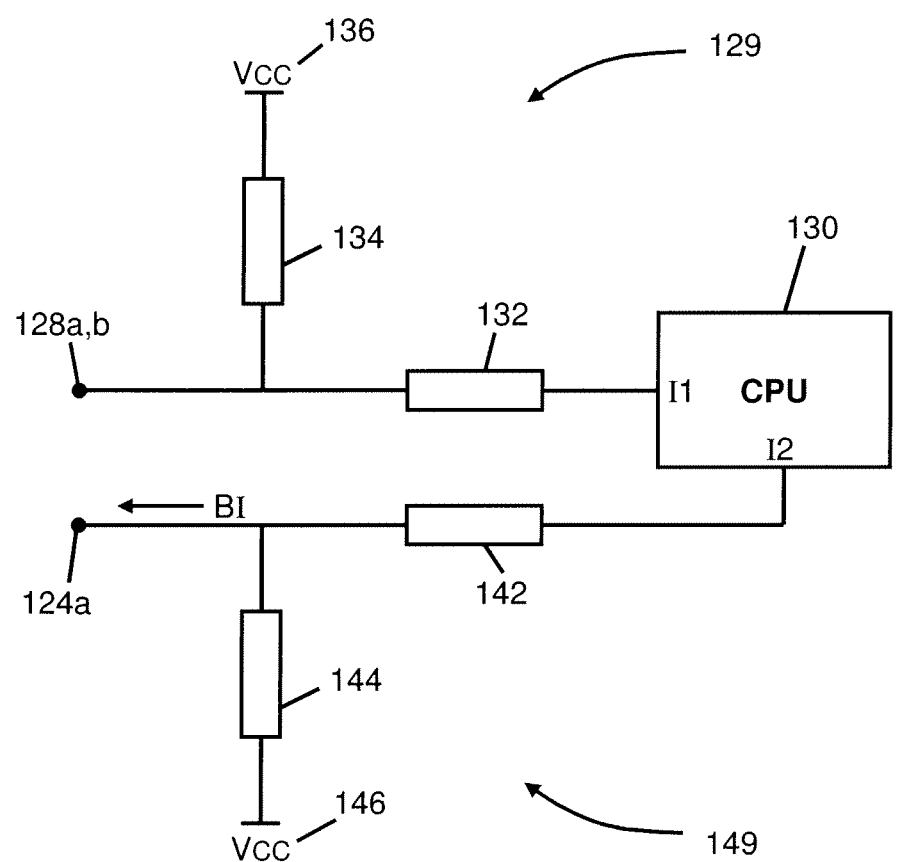
FIG. 5 shows an example of circuitry coupled to detect contacts for detecting a plug and/or determining a type of microphone button.

FIG. 5 illustrates additional plug detect circuitry 129 coupled to detect contact 128a or 128b for detecting the presence of a plug in accordance with one embodiment of the present invention. Detect contact 128a or 128b can be an input (such as at input I1) to control unit 130, which can detect whether or not detect contact 128a or 128b is high or low, and instruct cell phone 100 to behave accordingly. For example, in the illustrative embodiment of FIGS. 3A-3B, when the control unit detects that the signal on detect contact 128a is high, the control unit may instruct the cell phone to route input and output signals through contacts 124a-d to the headset, as opposed to built-in speaker 108 and microphone 110. Likewise, in the illustrative embodiment of FIGS. 4A-4B, when the control unit detects that the signal on detect contact 128b is low, the control unit may instruct the cell phone to route input and output signals through contacts 124a-d to the headset. Control unit 130 can comprise, for example, a CPU, other digital circuitry, analog circuitry, or any combination thereof.

Additional circuitry 132-136 can be interposed between control unit 130 and detect contact 128a or 128b. For example, in the illustrative embodiment of FIG. 5, additional circuitry 132-136 can respectively include a current limiting resistor or resistor network 132, a pull-up resistor or resistor network 134 (e.g., a bias resistor), and a power source 136.

FIG. 5 also shows microphone button type detect circuitry 149 (or headset type detect circuitry 149 in some embodiments) coupled to detect contact 124a for detecting the type of microphone button of a headset (or a type of headset, such as a headset having a type of microphone button, in some embodiments) in accordance with one embodiment of the present invention. Detect contact 124a can be an input (such as at input I2) to control unit 130 and/or detect circuitry 149, which can (1) determine a voltage, current or signal identifying or associated with an overcurrent (e.g., when the microphone button is pressed and not in its normal position), a normal current, or an undercurrent (e.g., when the microphone button is pressed and not in its normal position), and (2) instruct cell phone 100 to behave accordingly. As further explained for FIGS. 6-11, when the microphone type detect circuitry detects an overcurrent or an undercurrent at contact 124a (e.g., when the microphone button is pressed and not in its normal position), the microphone type detect circuitry (e.g., the control unit) may control (or change) the behavior of the cell phone (e.g., instruct the phone to behave a certain way) such as by causing the phone to: connect a call, disconnect a call, identify a type of microphone button, identify a type of headset, determine whether or not jack 112 is operating properly, determine whether or not a plug detect circuit is operating properly, and/or instruct the cell phone to behave otherwise as described herein. In some cases, when the microphone type detect circuitry detects an overcurrent or an undercurrent at contact 124a (e.g., when the microphone button is pressed and not in its normal position), the microphone type detect circuitry (e.g., the control unit) may control behavior by causing the cell phone to receive input audio signals from contact 124a of the headset as opposed to from microphone 110.

In some cases, a processor of the device may be connected to a memory and change a behavior of a media player application and/or telephony application stored in the memory, based on detecting the undercurrent or overcurrent (e.g., when the microphone button in pressed). Media player applications contemplated include, but are not limited to, video, audio, text, browser, MP3 player, and other media player applications known in the industry for portable devices. Changes to such media player applications include changes to controls for (including switching from one to another) play, fast-forward, reverse, selection, volume, output, input, brightness, and/or other controls. Similarly, telephony applications contemplated include, but are not limited to, cellular telephone, radio, wireless device, address book/database, and other telephony applications known in the industry for portable devices. Changes to such telephony applications include changes to controls for (including switching from one to another) call pickup, call hang-up, call dialing, selection, volume, output, input, brightness, and/or other controls.

Control circuitry 142-146 can be interposed between control unit 130 and detect contact 124a. For example, in the illustrative embodiment of FIG. 5, additional circuitry 142-146 can respectively include current limiting resister or resister network 142, a pull-up resister or resister network 144 (e.g., a bias resistor), and a power source 146.

In some cases, plug detect circuitry 129 may be considered to include control unit 130. Similarly, microphone type detect circuitry 149 may be considered to include control unit 130. In fact, in some embodiments, a microphone button type detect circuit (e.g., circuitry 149) may be considered to include circuitry 129 and control unit 130, such as where determining a microphone button or type of headset includes determining whether or not a plug is inserted into the jack. In some embodiments, control unit 130 and/or phone 100 may include a CODEC (e.g., a coder/decoder), a processor, and/or a signal processor, such as to process the output of microphone M1 (e.g., when a normal current is detected). Moreover, circuitry 129, control unit 130, and/or circuitry 149 may be part of a device or cell phone 100 as described herein.

Figure 6:
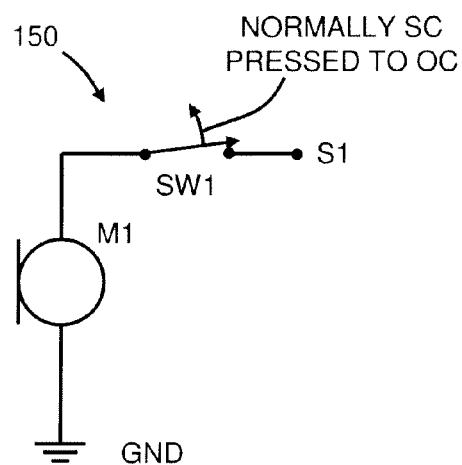
FIG. 6 shows an example of an electronic schematic of one embodiment of a headset microphone and headset microphone button circuit.

FIG. 6 shows an example of an electronic schematic of one embodiment of a headset microphone and headset microphone button circuit. FIG. 6 shows circuit 150 having microphone M1 electronically coupled between ground GND and switch SW1. Switch SW1 is electronically coupled between the output of microphone M1 and signal node S1. Signal node S1 may be coupled to contact 126a and ground GND may be coupled to a ground contact of the headset plug, such that a signal provided by circuit 150 at signal node S1 is the same as signal S at contact 126a. Switch SW1 may be a switch that is normally in the short circuit position, but when pressed (e.g., when the microphone button is not in its normal position) creates an open circuit between the output of microphone M1 and signal node S1.

Microphone M1 may be a microphone as known in the art, such as a microphone that uses a field effect transistor or amplification system to amplify a sensed signal in the audio range, such as from a human voice. When sensing an audio signal, the output of microphone M1 may have a voltage, current, or signal considered to be "normal" or in a normal range of voltage and/or current at signal node S1. However, when normally short circuited switch SW1 is switched to an open circuit, such as by pressing button 121, switch SW1 creates an open circuit between microphone M1 and signal node S1, such as to disconnect or isolate the output of microphone M1 from node S1.

Figure 7:
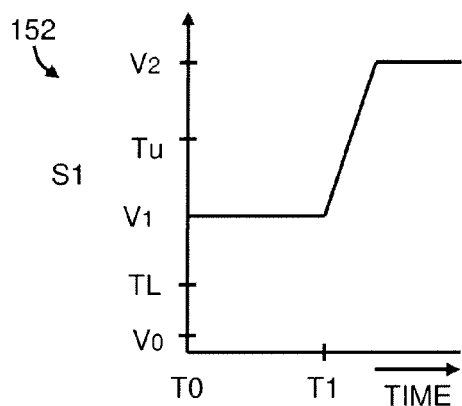
FIG. 7 shows one embodiment of an example of a signal output by circuitry 150 when the microphone button is pressed.

FIG. 7 shows one embodiment of an example of a signal output by circuitry 150 when the microphone button is pressed. FIG. 7 shows signal output graph 152 plotting the voltage at node S1 versus time. Graph 152 may represent a case where a bias voltage is applied to node S1 for proper operation of microphone M1 as known in the art. The bias voltage may be voltage $V_2$, and voltage $V_1$ may be a normal output voltage for the microphone M1 and response to the bias voltage.

Thus, graph 152 may show the situation where prior to time T1, switch SW1 is in its normally short circuited position (e.g., not pressed), and so a normal current and voltage signal is provided from microphone M1 to node S1, such as for detection at contact 124a, such as by control unit 130 and/or circuit 149. Time T1 may represent where switch SW1 is transitioned into an open circuit position, such as by pressing button 121. As a result, the voltage output at node S1 increases from $V_1$ to $V_2$ (e.g., the bias voltage), and can be detected at contact 124a such as by control unit 130 and/or circuit 149. In other words, after time T1 and "undercurrent" may be detected at or output from node S1, and may be detected by cell phone 100, control unit 130 and/or circuit 149 as a result of switch SW1 being in the open circuit position when the button is pressed. This undercurrent (or voltage $V_2$) may be used by the cell phone, control unit, and/or circuitry 149 to identify or determine a type of microphone button for button 121.

Figure 8:
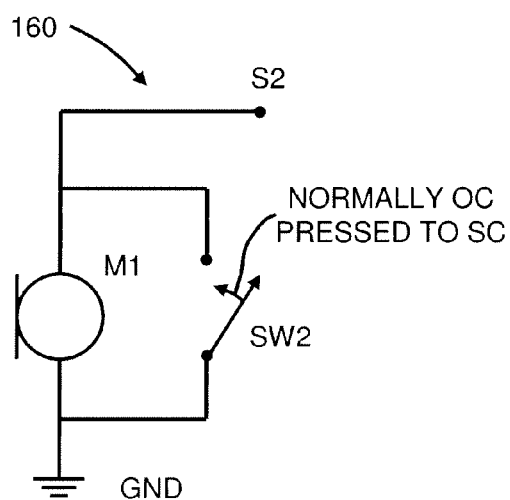
FIG. 8 shows an example of an electronic schematic of one embodiment of a headset microphone and headset microphone button circuit.

FIG. 8 shows an example of an electronic schematic of one embodiment of a headset microphone and headset microphone button circuit. FIG. 8 shows circuit 160 having microphone M1 electronically coupled between ground GND and signal node S2. Switch SW2 is electronically coupled across, or between the input and output of microphone M1. Signal node S2 may be coupled to contact 126a and ground GND may be coupled to a ground contact of the headset plug, such that a signal provided by circuit 160 at signal node S2 is the same as signal S at contact 126a. Switch SW2 may be a switch that is normally in the open circuit position, but when pressed (e.g., when the microphone button is not in its normal position) creates a short circuit across, or between the input and output of microphone M1, such as to short node S2 to ground GND. That is, when normally open circuited switch SW2 is switched to a short circuit, such as by pressing button 121, switch SW2 creates a short circuit between microphone signal node S2 and ground, such as to disconnect or isolate the output of microphone M1 from node S2.

Figure 9:
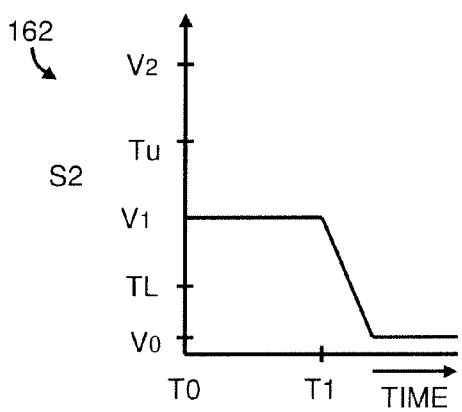
FIG. 9 shows one embodiment of an example of a signal output by circuitry 150 when the microphone button is pressed.

FIG. 9 shows one embodiment of an example of a signal output by circuitry 160 when the microphone button is pressed. FIG. 9 shows signal output graph 162 plotting the voltage at node S2 versus time. Graph 162 may represent a case where a bias voltage is applied to node S2 for proper operation of microphone M1 as known in the art. The bias voltage may be voltage $V_2$, and voltage $V_1$ may be a normal output voltage for the microphone M1 and response to the bias voltage.

Thus, graph 162 may show the situation where prior to time T1, switch SW2 is in its normally open circuited position (e.g., not pressed), and so a normal current and voltage signal is provided from microphone M1 to node S2, such as for detection at contact 124a, such as by control unit 130 and/or circuit 149. Time T1 may represent where switch SW2 is transitioned into a short circuit position, such as by pressing button 121. As a result, the voltage output at node S2 decreases from $V_1$ to $V_0$ (e.g., zero voltage), and can be detected at contact 124a such as by control unit 130 and/or circuit 149. In other words, after time T1 and "overcurrent" may be detected at or output from node S2, and may be detected by cell phone 100, control unit 130 and/or circuit 149 as a result of switch SW2 being in the short circuit position when the button is pressed. This overcurrent (or voltage $V_0$) may be used by the cell phone, control unit, and/or circuitry 149 to identify or determine a type of microphone button for button 121.

The normal current, overcurrent or undercurrent described for FIGS. 6-9 may be described as a voltage change or a resulting voltage of a voltage change, such as a change resulting in voltage $V_0$ or $V_2$ as shown and described for FIGS. 7 and 9 (e.g., occurring during or after a microphone button is pressed).

FIG. 5 also shows bias current BI, such as a current controlled by power 148 and resistor or resistor network 144 to be output to contact 124a. Thus, bias current BI may be a current received at contact 126a of plug 114 and used to bias microphone M1. Bias current BI may provide a voltage between contact 124a and ground of voltage $V_2$ when contact 124a is coupled to an open circuit, voltage $V_1$ when contact 124a is coupled to microphone M1 in normal operation (e.g., when the output of the microphone is a normal current), and voltage $V_0$ when contact 124a is coupled to a short circuit (e.g., microphone M1 is bypassed with a short circuit).

For example, referring to FIGS. 6 and 7, when bias current BI is applied to node S1, graph 152 may plot the output at node S1, as described further below. Similarly, for FIGS. 8 and 9, when bias current BI is applied to node S2, graph 162 may plot the output at node S2, as described further below.

In some cases, the power supplied at power 136 and/or 146 may be approximately 3 volts, and resister or resister network 144 may have a value such that bias current BI is 2 mA (milli-Ampheres). Also, in some cases, voltage $V_2$ may represent three volts, voltage $V_1$ may represent 3 volts, voltage $V_1$ may represent approximately 1.5 volts (e.g., 1.5 volts plus or minus the appropriate amount of voltage for a normal signal, from the microphone, as known in the art), and voltage $V_0$ may represent approximately zero volts. Moreover, in some cases, voltage $V_2$ may represent an undercurrent detected, such as where contact 124a, signal node S1 or signal node S2 is coupled to an open circuit. In some cases, voltage $V_1$ may correspond to a normal current situation, such as where contact 124a, signal node S1 or signal node S2 is coupled to the output of microphone M1 without a short circuit or open circuit coupled to the contact or node. Also, in some cases, voltage $V_0$ may represent and overcurrent situation, such as where contact 124a or node S1 is coupled to a short circuit (e.g., a short circuit is coupled between node S2 and ground).

FIGS. 7 and 9 also show upper voltage threshold TU between voltage $V_1$ and voltage $V_2$; and lower voltage threshold TL between voltage $V_1$ and voltage $V_0$. For example, control unit 130 and/or circuit 149 could detect a voltage level (e.g. a resulting voltage of a voltage change, when the microphone button is pressed) between signal S, node S1, node S2, and/or contact 124a and ground. The detected voltage may then be compared with the voltage levels on graphs 152 and 162 to determine whether or not a normal current, an overcurrent or an undercurrent is detected. The normal current, overcurrent or undercurrent may be described as a voltage change or a resulting voltage of a voltage change, such as shown and described for FIGS. 7 and 9 (e.g., occurring during or after a microphone button is pressed). If the voltage is below threshold TL, it may be determined that an overcurrent is detected. If the voltage is between threshold TL and threshold TU, it may be determined that a normal current is detected. However, if the voltage is above threshold TU, it may be determined that an undercurrent is detected.

Detection of a normal current may determine that the headset is a type not having a microphone button; or is a type having a button but that the button is not pressed or is released. Detecting an undercurrent may determine a headset type having a microphone button type that switches between coupling the microphone to contact 126a and coupling an open circuit to contact 126a. This button type may also be associated with a switch that is normally in the short circuit position, but when pressed is in the open circuit position between the microphone and contact 126a. In addition, detecting an overcurrent may determine or identify a headset that has a microphone button type that switches between coupling the microphone to contact to 126a and coupling a short circuit between contact 126a and ground. This button type may be described as a button that normally forms an open circuit across the microphone input and output, but that when pressed forms a short circuit between the microphone input and output, or that when pressed forms a short circuit between contact 126a and ground. As known in the art, an open circuit describes an impedance path having approximately infinite impedance or resistance; while a short circuit describes an impedance path having approximately zero impedance or resistance.

Other button types are considered, but may not be recognized, determined or identified (e.g., by the circuitry, control unit, or cell phone). Examples of such other button types include a button type associated with a switch normally in the short circuit position, but when pressed adds a resistance between the contacts of the switch that is neither a short circuit nor an open circuit, such as by having a resistance that is between approximately zero and infinite impedance, such as a resistance that is between 100 ohms and 100K ohms. Another button type is associated with a switch that is normally in the open circuit position, but when pressed switches in a resistance that is neither a short circuit nor an open circuit as described above. The third button type is a button associated with a switch that in the normal position provides a resistance between open circuit and short circuit as described above, but when pressed switches an open circuit between its contacts. A fourth type of button is a button that is associated with a switch that normally has a resistance that is between an open circuit and a short circuit, but when pressed switches an open circuit between its contacts. Thus, in some embodiments, the button type detection circuitry described herein can determine a button associated with a switch as described above for FIGS. 6-9, as compared or opposed to the other types described above. In some cases, the button type detection circuitry will not be able to determine or identify the other types when a plug of a headset having one of the other type buttons is inserted into the jack and the microphone button is pressed.

FIG. 10 is a truth table of one embodiment of output states or outputs of a microphone button type detect circuit (or headset type detect circuit, in some embodiments) based on current detected and plug detection. FIG. 10 shows truth table 170 of outputs vs. current and plug detection, associated with embodiments of one or more of FIGS. 1-9. For instance, the normal current, overcurrent, and undercurrent of Table 170 may be detected by cell phone 100, control unit 130, and/or circuit 149. Those currents may be detected or received from circuit 150 or circuit 160, such as shown in Graphs 152 and 162. Also, plug detection may be detected by cell phone 100, control unit 130, and/or circuit 136, such as according to headset jack 112 and headset plug 114 as shown in FIGS. 2A, 2B and 3A through 3B or 4A through 4B.

The first column of table 170 shows the situation where a normal current is detected (e.g., such as described above for graphs 152 and 162 and FIG. 5), but a plug is not detected (e.g., as described for FIGS. 2A through 4B and FIG. 5). The result of column 1 may be described as state E1. In this case, cell phone 100, control unit 130, and/or circuitry 129 may be malfunctioning by not detecting the insertion of the plug while receiving a normal current from the microphone.

Column 2 of table 170 describes a situation wherein overcurrent is received, but a plug is not detected in the jack. The result of this state may be described as state E2. Similar to state E1, this situation may describe where the jack or circuitry 129 is malfunctioning or failing to detect plug insertion into the jack while receiving an overcurrent from the microphone button (e.g., from circuit 160). The detection at State E1 and/or E2 may control (or change) the behavior of the cell phone by causing the cell phone or control unit to recognize an error state or that the plug detection circuitry (e.g., the jack or circuitry 129) is malfunctioning.

In the third column, an undercurrent is detected by no plug is detected in the jack. Although this situation may describe a malfunction or error in the switch, such as where the microphone button is normally short circuited but currently in the open circuit position (e.g., see FIGS. 6-7 and description thereof) and the plug detection circuit or jack is malfunctioning. However, the situation may also describe where there is no plug in the headset jack and thus the plug detection circuitry is detecting an open circuit or undercurrent. Thus, the state in this case may be described as No Headset Plugged In.

In column 4 of table 170, a normal current is detected and a plug is detected in the jack. This situation may describe where the plug is detected as noted in FIGS. 2-5, and where a normal current is detected as noted in FIGS. 5-9, such as where the microphone button is released. Thus, in this situation, the type of microphone button or headset may be indeterminate. In some situations, the type of headset may be a type that does not include a microphone button. Here, a normal audio signal may be detected, such as to provide audio data from microphone 120 to the cell phone. This state may be described as Head Set Plugged In, Button Released.

In the fifth column, and overcurrent is detected and a plug is detected in the jack. This situation may be described by a plug being detected as described for FIGS. 2-5, and an overcurrent being detected as described for FIG. 5 and FIGS. 8-9. Thus, in this situation, a microphone button type or headset type may be determined or identified from a plurality of buttons or headset types. For example, the headset may include a button and the button may include a switch that is normally in the open circuit position across the microphone, but the button is currently pressed and in the short circuit position, thus providing the overcurrent. The state in this situation may be described as Headset Plugged In with Button Type Associated with Normally Open Circuit Switch and Button Pressed to Short Circuit.

In the sixth column, and undercurrent is detected and a plug is detected in the jack. This situation may be described by a plug being detected as described for FIGS. 2-5, and an undercurrent being detected as described for FIG. 5 and FIGS. 6-7. Thus, in this situation, a microphone button type or headset type may be determined or identified from a plurality of buttons or headset types. For example, the headset may include a button and the button may include a switch that is normally in the short circuit position in series with the microphone output, but the button is currently pressed and in the open circuit position, thus providing the undercurrent. The state in this situation may be described as Headset Plugged In with Button Type Associated with Normally Short Circuit Switch and Button Pressed to Open Circuit.

Figure 11:
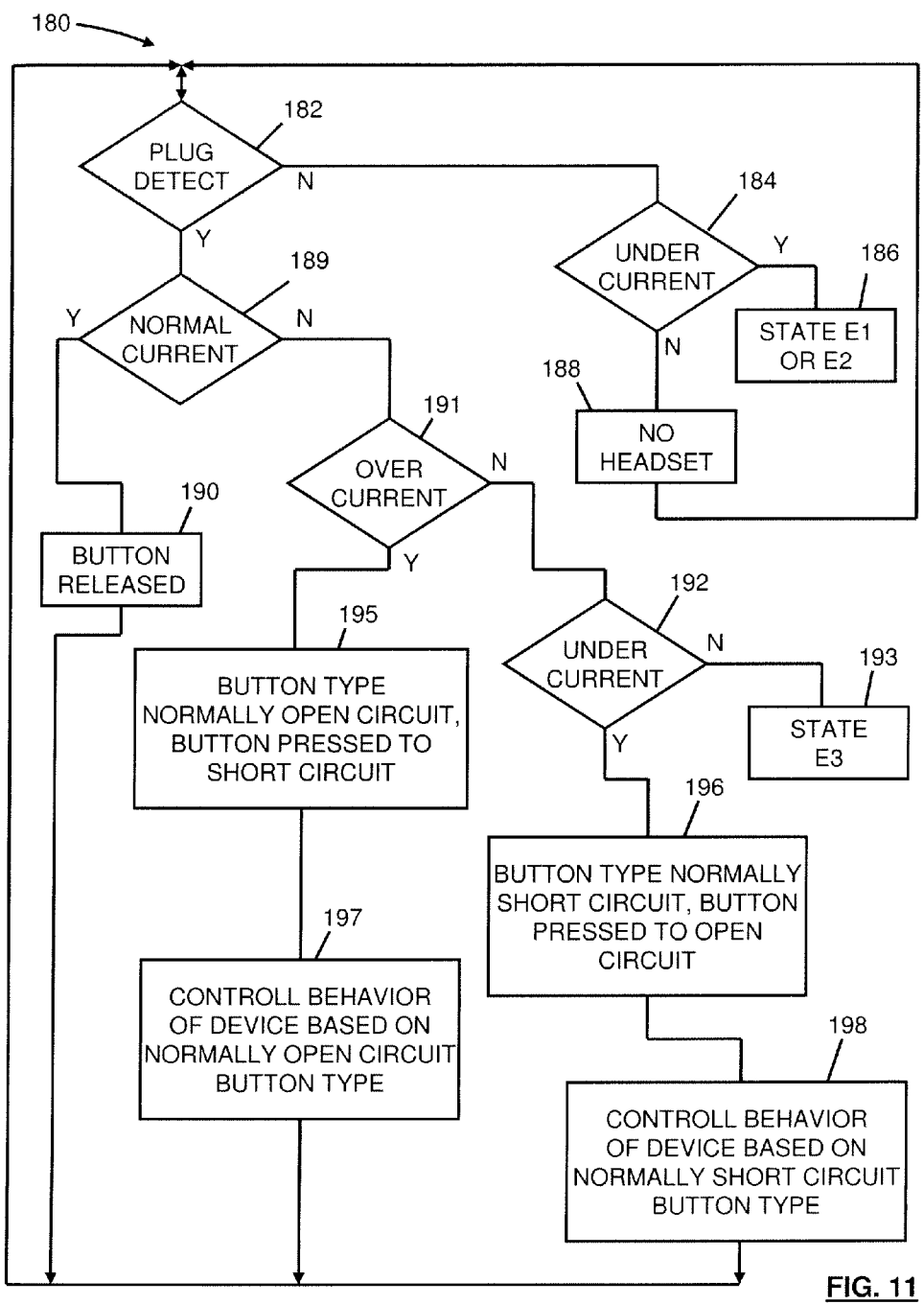
FIG. 11 shows an example of a flow diagram of a process for determining a type of microphone button based on detecting a current and a plug.

FIG. 11 shows an example of a flow diagram of a process for determining a type of microphone button (or a type of headset, in some embodiments) based on detecting a current and a plug. FIG. 11 shows flow diagram 180 (or process 180) which may embody a flow (or process) from one or more embodiments described for one or more of FIGS. 1-10. In some embodiments, process 180 is implemented by, controlled by, or caused by circuit 129, control unit 130, and/or circuit 149. In some cases, flow 180 may be controlled by control unit 130 or cell phone 100. In addition, some or all of the blocks of flow 180 (e.g., the detections of the decision blocks) may be described as control (or change) of the behavior of the cell phone.

Flow 180 starts with block 182 where it is determined whether or not a plug is detected. If at block 182 a plug is not detected, the flow continues to block 184 where it is determined if an undercurrent is detected. If at block 184 an undercurrent is not detected, the flow continues to block 188 where it is determined that a headset is not plugged in. After block 188 the flow may return to block 182, such as to continue to determine if or when a plug is inserted into the jack or has been removed.

Alternatively, if at block 184 an undercurrent is detected, the flow continues to block 186. Block 186 may correspond to state E1 or state E2 as described for FIG. 10. Alternatively, block 186 may correspond to block 188, such as where an error state is not determined and the cell phone continues to detect for the plug. Also, in some cases, regardless of the embodiment of block 186, processing may return to block 182 after block 186 (not shown in FIG. 11), such as to continue to determine if or when a plug is inserted into the jack or has been removed.

If at block 182 a plug is detected, processing continues to block 189 where it is determined whether or not a normal current is detected. If at block 189 a normal current is detected, processing continues to block 190 where it is determined that the microphone button is released, such as to allow normal audio signals to be received by the cell phone. In some instances, block 190 may represent a situation where the headset or microphone does not include a microphone button. After block 190, flow 180 returns to block 182, such as to determine whether or not the plug is still inserted into the jack or has been removed.

If at block 189 a normal current is not detected, processing continues to block 191, where it is determined whether or not an overcurrent is detected. If an overcurrent is detected, processing continues to block 195 where it is determined, as noted herein, that out of a number of different button types, this button type is associated with a switch that is normally in the open circuit position, but the button is pressed to cause the switch to be in the short circuit position.

After block 195, processing continues to block 197, where behavior of the device is controlled based on the type of button detected (e.g., that the button is a type associated with normally open circuit, as is a type determined in block 195). After block 197, processing returns to block 182, such as to determine whether or not the plug is still inserted in the jack or has been removed from the jack.

If at block 191 an overcurrent is not detected, processing continues to block 192, where it is determined whether or not an undercurrent is detected. If at block 192 an undercurrent is detected, processing continues to block 196. Block 196 may describe a situation, as noted herein, that out of a number of different button types, this button is a type of button associated with a normally short circuit switch, but the button is pressed to cause the switch to be in an open circuit position, causing the undercurrent.

After block 196, processing continues to block 198, where behavior of the device is controlled based on the type of button detected (e.g., that the button is a type associated with normally short circuit, as determined at block 196). After block 196, processing returns to block 182, such as to determine whether or not the plug is still inserted in the jack or has been removed from the jack.

If at that block 192 it is not determined that an undercurrent exists, processing continues to block 193. Block 193 may describe State E3, such as a state where a malfunction or error is detected in control unit 130 and/or circuitry 149. For example, block 193 might indicate that circuitry 129 is operating properly, thus a plug is detected in the jack, but circuitry 149 is malfunctioning, thus neither a normal, overcurrent, nor undercurrent is detected by circuitry 149. Here, the detection at State E3 may control (or change) the behavior of the cell phone by causing the cell phone or control unit to recognize an error state or that the button type detect circuitry (e.g., the jack or circuitry 149) is malfunctioning.

Also, State E3 may describe where circuitry 149 is operating properly, but control unit 130 or cell phone 100 is malfunctioning. In other embodiments, block 193 may represent where no headset is detected, such as described at block 188. Regardless of which embodiment of block 193 is used, in some cases, after block 193, processing may return to block 182.

A selection may be made based on determining or identifying the button or headset type as described herein (e.g., see FIGS. 5-11, such as the situations described by column 5 and 6 of FIG. 10, such as the situations described by column 5 and 6 of FIG. 10, and blocks 197 and 198 of FIG. 11). This selection may describe control (or change) of the behavior of the cell phone or portable device. Thus, pressing and/or releasing the microphone button, and/or determining a type of button (or determining a type of headset, in some embodiments) may control (or change) the behavior of a cell phone or portable device having a jack that the plug is inserted into. In some cases, the behavior controlled may include whether or not the microphone output is sent to the device, and other behaviors as noted herein (such as "push to talk" behaviors as known in the art).

In some embodiments, behaviors may include selecting a predetermined circuit, a predetermined algorithm, and/or a predetermined process from a number of circuits, algorithms, or processes for signal processing the signal received from the microphone (e.g., the normal current) based on the type of button or headset determined. For example, the behavior of cell phone 100, control unit 130, or another processor, codec, or control unit of a device having the jack may be controlled by, or be coupled to circuitry or software algorithms for processing the output or normal signal of the microphone differently depending on whether or not the button type detected is associated with a switch normally in the open circuit or short circuit position. Thus, if the button type detected is associated with a switch normally in the open circuit position, one circuit or algorithm may be used to process the microphone output signal, while if the button type is associated with a normally short circuit switch, a different set of circuitry or algorithm may be used to process the microphone output signal. Specifically, in some cases, for a button type associated with a switch normally in the open circuit, the circuitry or algorithm may be predetermined for monitoring for or detecting presses of a button associated with a switch normally in the open circuit position, but not to monitor or detect presses of a button normally in the short circuit position (and optionally, not for any type of button other than the one detected). It can be appreciated that this may provide the benefit of reducing the amount of active circuitry, power consumed, or processing to that required for just the determined button type, as compared to requiring circuitry or algorithms for monitoring or detecting presses of both button types (e.g., button types associated with a normally open circuit and short circuit).

Alternatively, if it is determined or identified that the button type is associated with a button having a switch normally in the short circuit position, a set of predetermined circuitry or algorithms can be used to process the signal from the microphone that monitor for or detect a button associated with a switch normally in a short circuit position but when pressed transitions to an open circuit position, but not detect for a button normally in the open circuit position. In this case, the benefits are similar to those for only having to detect for a button associated with a normally open switch.

In addition, in some embodiments, blocks 197 and/or 198 may include selecting predetermined circuitry or algorithms until a plug is no longer detected in the jack or until a different type of microphone button is detected. For example, the predetermined circuitry or algorithm may be selected until a plug is no longer detected at block 182, or until a button type associated with the different switch is detected (e.g., until the process progresses from block 197 to block 198, or until it progresses from block 198 to block 197. It can be appreciated that this may provide the benefit of additionally reducing the amount of active circuitry, power consumed, or processing, as compared to where detection and/or determination of a microphone button type occurs each time the button in pressed.

In some cases, signal node S1 of FIG. 6 may be the same as or electrically coupled with approximately zero impedance to contact 126a. Similarly, in some cases signal node S2 of FIG. 8 may be the same as electronically coupled with approximately zero impedance to contact 126a. It is contemplated that the electronic coupling between signal nodes S1 or S2 and contact 126a may be a wired or wireless electronic connection or attachment. For example, it can be appreciated that a wireless transmission system may exist between nodes S1 or S2 and contact 126a, such as a transmission system capable of transmitting audio signals, current, and voltage levels as described herein.

The comparison of the voltage at signal nodes S1 or S2 and thresholds TU and TL may be performed by a comparator, such as a comparator of circuitry 149 or control unit 130 (not shown) of FIG. 5. Such a comparator could compare the voltage level received at contact 124a with ground GND. Moreover, the result of the comparison could provide a current measurement detected by a current detect circuitry to detect an undercurrent, normal current, or overcurrent as described above. The current detect circuitry could be part of circuitry 149 and/or control unit 130. As a result of the current detected, button association circuitry (not shown) of FIG. 5 could determine if the button is associated with a normally open switch that when pressed forms a short circuit; or a normally closed switch, that when pressed forms an open circuit. Such button association circuitry can be part of circuitry 149 or control unit 130 (not shown) of FIG. 5. In addition, the button association circuitry may include circuit 129 to determine whether or not a headset plug is inserted in the headset jack.

In some embodiments, circuitry 129, control unit 130 and/or circuitry 149 may include button press circuitry to detect whether or not the button is pressed, such as to detect if the button is pressed if an overcurrent or undercurrent is detected and a plug is inserted in the jack, or to detect that the button is not pressed if a normal current is detected and the plug is in the jack. Control unit 130 and/or circuitry 149 may also include a selector (not shown in FIG. 5) to select between a predetermined circuit, a predetermined algorithm, and a predetermined process as described above. Control unit 130 and/or circuit 129 may included an open/short detect circuitry (not shown in FIG. 5) to detect an open circuit or low impedance path at contact 128a, b as described above to determine if a headset plug is inserted into the headset jack based on a voltage received at contact 128a, b. For example, as noted above for FIGS. 3A-3B, when a plug is inserted into the jack, a gap by be created between contacts 124d and 120a opening the circuit previously established across the two contacts, thus providing an electromechanical switch. That switch is based on whether or not a plug is inserted into the jack. Likewise, for FIGS. 4A and 4B, when a plug is inserted into the jack, a low impedance path may be created between contact 128b and contact 124b causing a signal on detect contact 128b to go low, also providing an electromechanical switch that switches based on whether or not is inserted into the jack.

As noted above in FIGS. 6-11, in some instances determining whether or not a headset is inserted into the jack may occur prior to detecting an overcurrent, detecting an undercurrent, or determining a type of microphone button. It is also considered that determining whether or not a headset plug is inserted into the headset jack may occur during detecting an overcurrent, detecting an undercurrent, or determining a type of microphone button. Finally, some embodiments may include detecting whether or not the plug is inserted during and prior to detecting the current or button type as described above.

Some portions of the detailed descriptions herein are presented in terms of algorithms which include operations on data stored within a computer, portable device, telephone or cellular telephone memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, computer, portable device, telephone, cellular telephone or similar electronic device, that manipulates and transforms data represented as physical (electronic) quantities within the system's registers and memories into other data similarly represented as physical quantities within the device's memories or registers or other such information storage, transmission or display devices.

The present invention (e.g., phone 100 or an electronic device represented by phone 100) can relate to an apparatus or device for performing one or more of the operations described herein. This apparatus or device may be specially constructed for the required purposes, or it may comprise a general purpose computer, portable device, telephone or cellular telephone selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices.

At least certain embodiments of the invention (e.g., phone 100 or an electronic device represented by phone 100) may be part of a digital media player or device, such as a portable music and/or video media player, computer, portable device, telephone or cellular telephone, which may include a media processing system to present the media, a storage device to store the media and may further include a radio frequency (RF) transceiver (e.g., an RF transceiver for a cellular telephone) coupled with an antenna system and the media processing system, computer, portable device, telephone or cellular telephone. In certain embodiments, media stored on a remote storage device may be transmitted to the media player through the RF transceiver. The media may be, for example, one or more of music or other audio, still pictures, or motion pictures.

Embodiments of the inventions described herein (e.g., phone 100 or an electronic device represented by phone 100) may be part of other types of data processing systems or devices, such as, for example, entertainment systems or personal digital assistants (PDAs), or general purpose computer systems, or special purpose computer systems, or an embedded device within another device, or cellular telephones which do or do not include media players, or devices which combine aspects or functions of these devices (e.g., a media player, such as an iPod® and/or a cellular phone, such as an iPhone® (both from Apple Inc. of Cupertino, Calif.) combined with a PDA, and an entertainment system in one portable device).

In some case, cell phone 100 may represent any portable, mobile, hand-held, or miniature electronic device with a jack capable of receiving and detecting a plug and a microphone button type of an accessory device so as to allow a user to use the accessory in conjunction with the electronic device. Alternatively, cell phone 100 may not be portable at all.

Headset 116 may be any component that can be coupled to and used in conjunction with phone 100, such as, but not limited to, audio speakers, earphones, headphones, a video display, microphone, or combinations thereof. In some cases, the headset may perform a single function (e.g., an accessory dedicated to capturing audio signals and passing them on to phone 100) and, in other cases, the headset may perform multiple functions (e.g., an accessory that captures audio signals to pass on to the electronic device, as well as an accessory that receives audio signals from the electronic device and amplifies them for a user).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for detecting a microphone button of a headset, the apparatus comprising:
a headset plug detect circuit configured to detect whether or not a headset plug is inserted into a headset jack of a device; and
in response to the headset plug detect circuit detecting that the headset plug is inserted into the headset jack, a headset type detect circuit configured to:
maintain a first contact of the headset jack at a constant voltage, that is greater than a lower voltage threshold and less than an upper voltage threshold, while the microphone button is in a non-activated state, during application of a bias voltage to the first contact of the headset jack, and until the microphone button of the headset is activated thereby causing a change in voltage of the first contact,
detect a voltage change at the first contact of the headset jack when the microphone button of the headset is activated during application of the bias voltage to the first contact of the headset jack,
wherein an undercurrent is detected if the first contact rises above the upper voltage threshold,
wherein an overcurrent is detected if the first contact falls below the lower voltage threshold, and
identify a type of microphone button from a plurality of microphone button types based on having detected the undercurrent or the overcurrent to change a behavior of the device based on the type of microphone button identified.

2. The apparatus of claim 1, wherein the headset type detect circuit further comprises:
a comparator to compare a resulting voltage of the voltage change to the upper voltage threshold and to the lower voltage threshold; and
current detect circuitry to detect the undercurrent if the resulting voltage is greater than the upper voltage threshold, to detect the overcurrent if the resulting voltage is below the lower voltage threshold, and to detect a normal current if the resulting voltage is between the lower voltage threshold and the upper voltage threshold.

3. The apparatus of claim 1, wherein the headset type detect circuit includes button association circuitry to:
(1) determine that the headset comprises a button associated with a normally open switch if the headset plug is determined to be inserted into the headset jack and the overcurrent is detected; and
(2) determine that the headset comprises a button associated with a normally closed switch if the headset plug is determined to be inserted into the headset jack and the undercurrent is detected.

4. The apparatus of claim 2, wherein the headset type detect circuit further comprises button press circuitry to:
detect that the button is activated if the overcurrent or the undercurrent is detected, and
detect that the button is non-activated if the normal current is detected.

5. The apparatus of claim 2, wherein the headset type detect circuit includes a selector to select one of a predetermined circuit, a predetermined algorithm, and a predetermined process from a plurality of circuits, algorithms or processes of the device to signal process the normal current based on the type of headset identified.

6. The apparatus of claim 1, wherein the headset plug detect circuit includes open/short detect circuitry to detect an open circuit or a low impedance path at a different second voltage received at a different second contact of the headset jack; and wherein the headset type detect circuit determines whether or not the headset plug is inserted into the headset jack based on the different second voltage.

7. The apparatus of claim 6, wherein the apparatus is a portable device and the open/short detect circuitry includes an electromechanical switch.

8. The apparatus of claim 1, wherein the headset type detect circuit further comprises current detect circuitry to detect that the voltage change indicates the overcurrent or the undercurrent.

9. The apparatus of claim 8, wherein detecting whether or not the headset plug is inserted comprises using a second signal received at a second contact of the headset jack, the second contact being different than the first contact.

10. The apparatus of claim 9, wherein the headset plug detect circuit includes:
   open/short detect circuitry to detect whether or not the headset plug is inserted by detecting an open circuit or a low impedance path using the second signal;
   circuitry to determine that the headset plug is not inserted into the headset jack if the second signal indicates that the headset is not inserted and the voltage change indicates the undercurrent; and
   error detect circuitry to determine that an error in detecting an open circuit or a low impedance path has occurred if the second signal indicates that the headset plug is not inserted and the voltage change indicates the overcurrent.

11. An apparatus for detecting a microphone button of a headset, the apparatus comprising:
   a headset plug detect circuit configured to detect whether or not a headset plug is inserted into a headset jack of a device; and
   in response to the headset plug detect circuit detecting that the headset plug is inserted into the headset jack, a headset type detect circuit configured to:
      maintain a first contact of the headset jack at a constant voltage, that is greater than a lower voltage threshold and less than an upper voltage threshold, while the microphone button is in a non-activated state, during application of a bias voltage to the first contact of the headset jack, and until a microphone button of the headset is activated thereby causing a change in signal level at the first contact,
      detect a first signal change at the first contact of the headset jack when the microphone button of the headset is activated during application of a bias voltage to the first contact of the headset jack,
      wherein an undercurrent is detected if a resulting voltage of the first signal change is greater than an upper voltage threshold,
      wherein an overcurrent is detected if the resulting voltage of the first signal change is less than a lower voltage threshold,
      identify a type of microphone button from a plurality of microphone button types based on (a) having detected the undercurrent or the overcurrent, and
      change a behavior of the device based on the type of microphone button identified.

12. The apparatus of claim 11, wherein the headset type detect circuit further comprises:
   a comparator to compare a resulting voltage of the first signal change to the upper voltage threshold and to the lower voltage threshold;
   current detect circuitry to detect the undercurrent if the resulting voltage is greater than the upper voltage threshold, to detect the overcurrent if the resulting voltage is below the lower voltage threshold, and to detect a normal current if the resulting voltage is between the lower voltage threshold and the upper voltage threshold.

13. The apparatus of claim 11, wherein the headset type detect circuit includes button association circuitry to:
   (1) determine that the headset comprises a button associated with a normally open switch if the headset plug is determined to be inserted into the headset jack and the overcurrent is detected; and
   (2) determine that the headset comprises a button associated with a normally closed switch if the headset plug is determined to be inserted into the headset jack and the undercurrent is detected.

14. The apparatus of claim 12, wherein the headset type detect circuit further comprises button press circuitry to:
   detect that the button is activated if the overcurrent or the undercurrent is detected, and
   detect that the button is non-activated if the normal current is detected.

15. The apparatus of claim 11, wherein the headset plug detect circuit includes open/short detect circuitry to detect an open circuit or a low impedance path at a second signal received at a second contact of the headset jack; and wherein the headset type detect circuit determines whether or not the headset plug is inserted into the headset jack based on the second signal.

16. The apparatus of claim 11, wherein the headset type detect circuit further comprises current detect circuitry to detect that the first signal change comprises the overcurrent or the undercurrent.

17. The apparatus of claim 16, wherein detecting whether or not a headset plug is inserted comprises using a different signal received at a different contact of the headset jack, the different contact being different than the first contact.

18. A portable multifunction device comprising:
   a memory storing a media player application;
   a microphone detect circuit configured to
      maintain a first contact of a headset jack of the portable multifunction device at a constant voltage, that is greater than a lower voltage threshold and less than an upper voltage threshold, while a microphone button of a headset is in a non-activated state during application of a bias voltage to the first contact of the headset jack and a headset plug of the headset in coupled to the headset jack, until the microphone button of the headset is activated which causes a change in voltage of the first contact,
      detect a first signal comprising an overcurrent or an undercurrent received at the first contact of the headset jack of the portable multifunction device when the microphone button of the headset is activated during application of the bias voltage to the first contact of the headset jack;
      wherein the undercurrent is detected if a voltage of the first signal is greater than the upper voltage threshold,
      wherein the overcurrent is detected if the voltage of the first signal is less than the lower voltage threshold;
      identify a first type of microphone button from a plurality of microphone button types when the undercurrent is detected, and a second type of microphone button from the plurality of microphone button types when the overcurrent is detected; and
   a processor coupled to the memory and to the microphone detect circuit, the processor to change a behavior of the media player application based on the identified type of microphone button.

19. The device of claim 18, wherein the microphone detect circuit:
   compares the voltage of the first signal to the upper voltage threshold and to the lower voltage threshold;
   detects the undercurrent if the voltage of the first signal is greater than the upper voltage threshold; and
   detects the overcurrent if the voltage of the first signal is below the lower voltage threshold; and detects a normal current if the voltage of the first signal is between the lower voltage threshold and the upper voltage threshold.

20. The device of claim 18, wherein the processor:
(1) determines that the microphone button is associated with a normally open switch if the first signal is detected to be the overcurrent;
(2) determines that the microphone button is associated with a normally closed switch if the first signal is detected to be the undercurrent.

21. The device of claim 18, further comprising headset plug detect circuitry coupled to the processor, the headset plug detect circuitry configured to detect a second signal received at a second contact of the headset jack, the second contact being different than the first contact.

22. The apparatus of claim 2, wherein the headset type detect circuit further comprises button press circuitry to:
detect that the microphone button is non-activated and that the bias voltage is not applied to the first contact of the headset jack if the normal current is detected.

23. The apparatus of claim 1, wherein detecting the first voltage change at the first contact when the microphone button of the headset is activated includes detecting the first voltage change at the first contact when the microphone button changes from a non-activated position to an activated position.

24. The apparatus of claim 12, wherein the headset type detect circuit further comprises button press circuitry to:
detect that the microphone button is non-activated and that the bias voltage is not applied to the first contact of the headset jack if the normal current is detected.

25. The apparatus of claim 11, wherein the first signal change at the first contact is detected in response to the microphone button changing from a non-activated position to an activated position.

26. The portable multifunctioning device of claim 19, wherein the processor detects that the microphone button is non-activated and that the bias voltage is not applied to the first contact of the headset jack if the normal current is detected.

27. The portable multifunctioning device of claim 18, wherein detecting the first signal at the first contact when the microphone button of the headset is activated includes detecting the first signal at the first contact when the microphone button changes from a non-activated position to an activated position.

* * * * *